(12) United States Patent
Jenkin et al.

(10) Patent No.: US 6,377,228 B1
(45) Date of Patent: *Apr. 23, 2002

(54) LARGE-SCALE, TOUCH-SENSITIVE VIDEO DISPLAY

(76) Inventors: Michael Jenkin, 103 St. Germain Ave., Toronto, Ontario (CA), M5M 1V9; John K. Tsotsos, 182 Strathearn Avenue, Richmond Hill, Ontario (CA), L4B 2S6

( * ) Notice: Subject to any disclaimer, the term of this patent is extended or adjusted under 35 U.S.C. 154(b) by 0 days.

This patent is subject to a terminal disclaimer.

(21) Appl. No.: 09/545,559

(22) Filed: Apr. 7, 2000

Related U.S. Application Data

(62) Division of application No. 08/011,453, filed on Jan. 29, 1993, now Pat. No. 6,118,433.

(30) Foreign Application Priority Data

Jan. 30, 1992 (GB) .............................................. 9201949

(51) Int. Cl.[7] ................................................. G09G 5/00
(52) U.S. Cl. ...................................... 345/1.3; 345/173
(58) Field of Search ................................. 345/173, 104, 345/174, 175, 176, 177, 178, 179, 180, 182, 1, 2, 3, 1.1, 1.2, 1.3, 18.01, 18.1

(56) References Cited

U.S. PATENT DOCUMENTS

| | | | |
|---|---|---|---|
| 4,695,135 A | 9/1987 | Blokland et al. | 340/717 |
| 4,725,694 A | 2/1988 | Auer et al. | 340/712 |
| 4,730,186 A | 3/1988 | Koga et al. | 340/716 |
| 4,746,981 A | 5/1988 | Nadun et al. | 342/717 |
| 4,800,376 A | 1/1989 | Suga et al. | 340/716 |
| 5,063,600 A | 11/1991 | Norwood | 340/712 |
| 5,079,636 A | 1/1992 | Brody | 358/241 |
| 5,105,183 A | 4/1992 | Beckman | 345/1 |
| 5,163,131 A | 11/1992 | Row et al. | 345/200 |
| 5,361,078 A | 11/1994 | Caine | 345/1 |
| 5,892,509 A * | 4/1999 | Jacobs et al. | 345/1 |
| 6,118,433 A * | 9/2000 | Jenkin et al. | 345/173 |

* cited by examiner

*Primary Examiner*—Xiao Wu
(74) *Attorney, Agent, or Firm*—Sim & McBurney (57) ABSTRACT

A video surface is constructed by adjoining a large number of flat screen display devices together. Each screen on this surface is controlled by its own computer processor and these processors are networked together. Superimposed over this surface is a tiling of transparent touch-sensitive screens which allow for user input. The resulting display is thin, has a very high resolution, appears to be a single large screen to the user, and is capable of supporting many different types of human-machine interaction.

38 Claims, 6 Drawing Sheets

LARGE-SCALE, TOUCH-SENSITIVE VIDEO DISPLAY

RELATED APPLICATION DATA

This application is a divisional of prior application Ser. No. 08/011,453; filed Jan. 29, 1993, now U.S. Pat. No. 6,118,433.

FIELD OF THE INVENTION

The present invention relates in general to video display systems, and more particularly to the construction of a large video display unit capable of supporting user interaction.

BACKGROUND OF THE INVENTION

Video walls are being used ever more frequently for displaying visual data on a large physical space. It is known in the art to mount a plurality of television monitors on a vertical surface in a rectangular grid and to control the video signal shown on each monitor for presenting different visual messages. The resulting display is more than just the sum of the outputs of each unit as the units can be combined logically into one large display, or subdivided at will. The use of standard replicated components allows for an inexpensive, flexible video display according to this known prior art.

The current technology is limited by (i) the large depth required by the video wall as each individual monitor requires a video tube in order to display the signal, (ii) the need for a centralized control of the display, and (iii) the lack of a natural input mechanism in order to interact with the display. These limitations restrict the use of video walls to one-way communication devices that simply show the information visually and do not provide for user interaction.

SUMMARY OF THE INVENTION

The present invention addresses these prior art restrictions while losing none of the advantages of well known video wall technology. In addition, according to an aspect of the present invention there is provided a large-scale video display in which (i) the depth of the video display is reduced to less than an inch, (ii) the control of the display is inherently distributed allowing for much more sophisticated control of the images presented, and (iii) direct, complex user interaction is possible with the information on the display. The resulting device can be mounted on any surface, in any orientation in space, including desktops.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1:
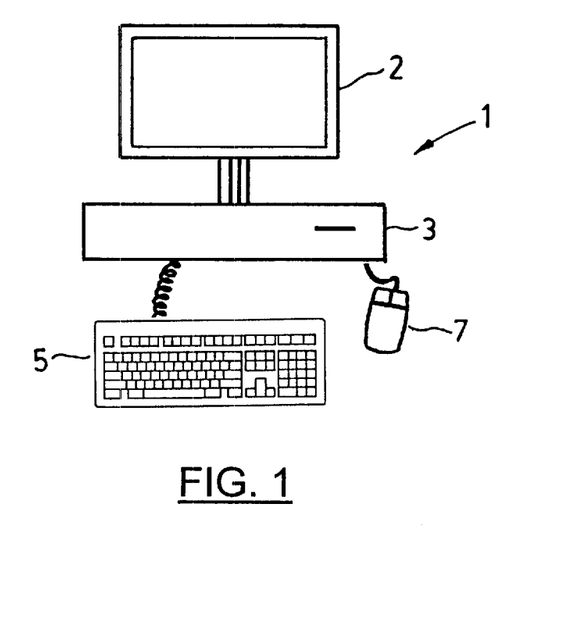
FIG. 1 is a schematic representation of a basic display unit (BDU)

FIG. 1 shows the basic construction of a BDU 1, a plurality of BDU's being connected to form a display unit (DU) as discussed in greater detail below. Each BDU 1 functions as a separate computer, capable of executing complex programs and controlling its own display 2. The BDU 1 consists of a flat screen display panel 2, such as a liquid crystal display or laser plasma display (as currently used in portable computers) connected to a BDU processor 3 (eg. standard portable computer incorporating a CPU for executing a graphics processor application, memory, logic level video driver, etc.). The screen 2 is connected to the BDU processor 3 via a cable (eg. standard ribbon cable) which provides control (video) signals as well as power. The connecting cable may be of any reasonable length and thus the BDU processor 3 need not necessarily be resident in a location adjacent to the display 2. Disassembling a standard portable computer yields this component. The component can also be purchased directly from the manufacturer as a replacement part. The display can be either monochrome, greyscale or colour. The flat screen display panel is very thin (roughly ⅛") mounted in a hard plastic shell.

The logic level drivers for each BDU 1 are utilized to convert logical operations at the circuit board level into graphical operations (e.g. putpixel, etc.). Logic level driver circuits are available directly from various manufacturers and can be incorporated in the BDU 1 in at least two possible ways. Firstly, the logic level driver may be mounted directly on the CPU board associated with the display 2. This provides a very fast interface between the processor 3 and the display 2. However, this approach does not offer a great deal of flexibility, particularly where the display 2 is dedicated to a particular CPU hardware. A second approach is to use a driver that receives standard video (i.e. R,G,B,) and maps the video signals onto the display 2. This approach results in greater flexibility than the first approach since the display can be mapped to different processor hardware. However, this second approach requires a more expensive interface unit for each display 2.

Various additional components may be connected directly to the screen 2 depending upon its underlying display technology. Side lit panels, for example, may be included having a light source mounted to the side of the screen.

Each display 2 is pixel based, such that each picture element of the display can be set either on or off (for monochrome displays) or to one of a fixed number of different shades (greyscale displays) or colours (colour displays).

Each BDU 1 is provided with its own power supply (not shown) and is equipped with a standard network connection. Each BDU processor 3 incorporates a predetermined amount of resident memory that is determined by the complexity of the display 2 that it controls and the application program it is to execute, plus a hard disk drive. Floppy disk drives are not necessary but can be included, since software may be loaded in over the network.

Each BDU processor may have an associated keyboard 5 and mouse 7 connected thereto for providing individual control over a BDU 1 during development phases and/or to provide a work-station for interaction with the final display.

Figure 2:
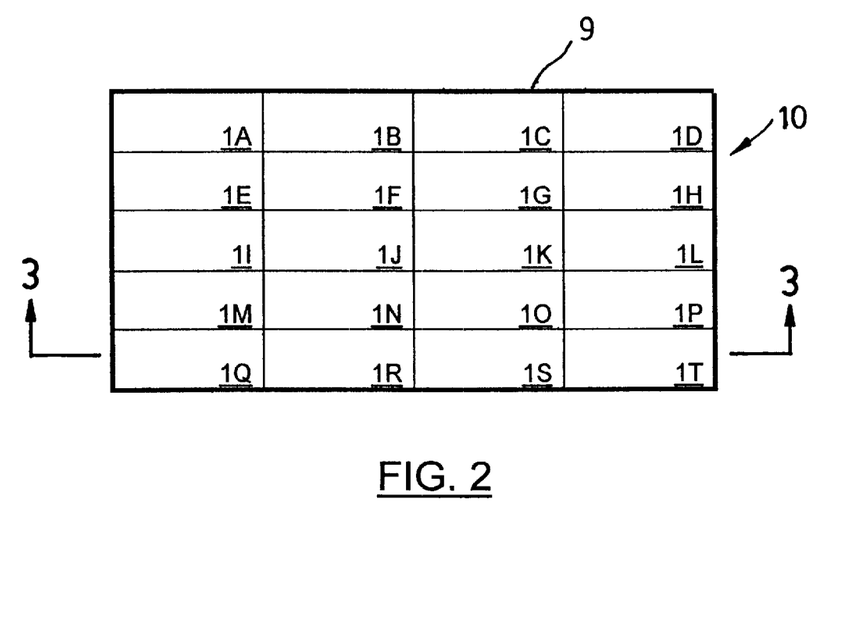
FIG. 2 shows a collection of BDU's networked together to form a display unit (DU)
Figure 9:
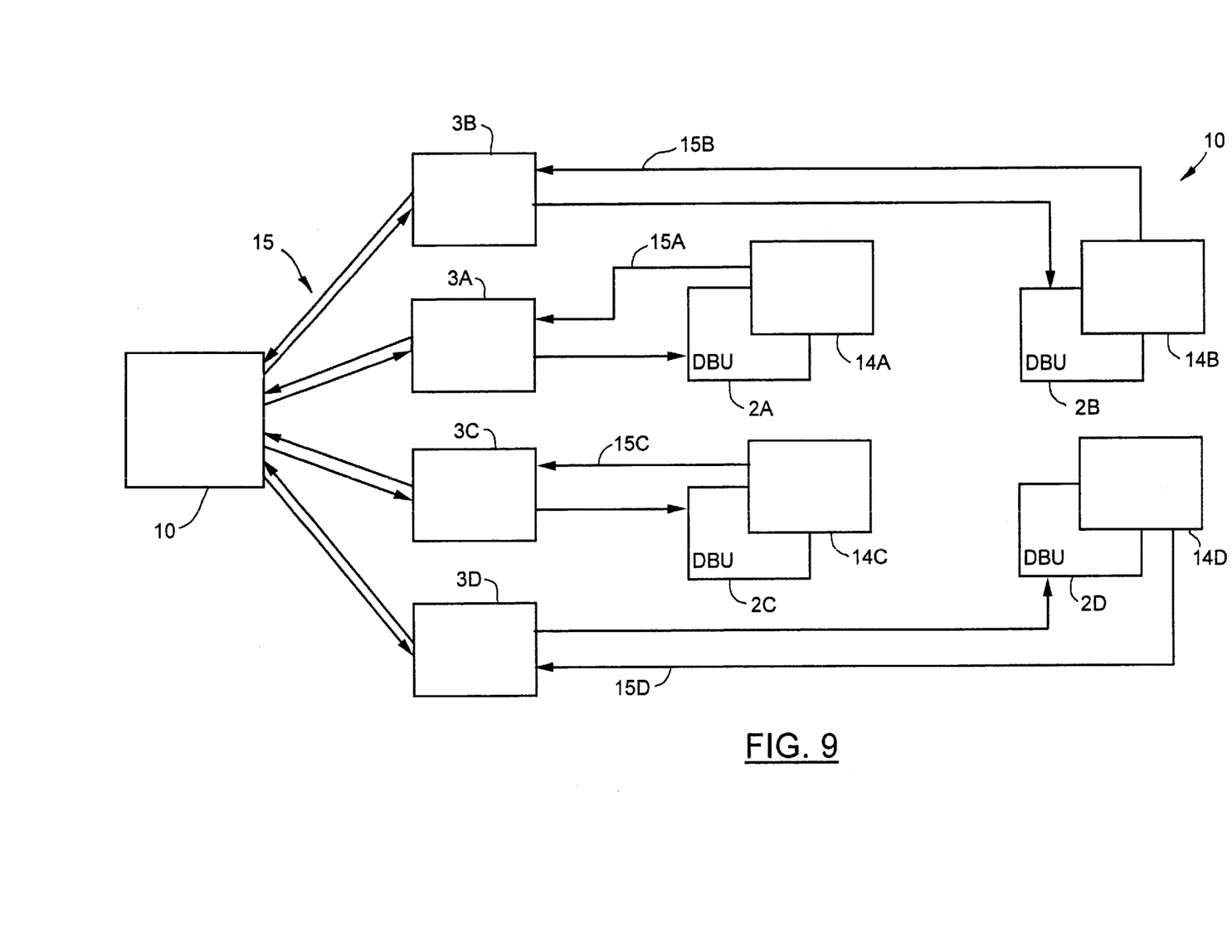
FIG. 9 is a detailed schematic of the BDUs shown in FIG. 2.

FIGS. 2 and 9 show the displays of a number of BDU's 1A–1T arranged together in a large frame 9 to form a display unit (DU 10). The number of BDU's combined to form a given DU 10 is a function of the particular application for which the DU is required. Each BDU display 2A–2D is connected to its corresponding BDU processor 3A–3D as shown in FIG. 1. However, according to an alternative embodiment of the invention, one or more of the individual BDU's 1A–1T may have more than one screen associated therewith. In this embodiment, the "multi-headed" BDU's distribute processing power over more than one individual screen which makes up the DU 10. Thus, a single computer (eg. Apple Macintosh or IBM compatible computer) may be equipped with a plurality of video drivers, each capable of driving one of the displays 2.

The individual units 1A–1T are supplied with power and are connected together using a standard network interface such as TCP/IP (which uses Ethernet™ as the physical medium), or Localtalk™, as discussed in greater detail below. The network connection of BDU's 1A–1T is shown schematically in FIG. 8, and the details thereof would be well known to a person skilled in the art to which the present invention pertains.

The displays 2A–2D of respective BDU's 1A–1T are abutted together so as to provide the impression of one large display area. Existing flat display technologies typically surround the useful portion of the screen with mounting points and connections to the external video source. In addition, some displays require an external source of illumination (side lit or back lit displays, for example). In these cases additional hardware is associated with the displays either at the sides or behind the useful portions thereof. In order to abut the BDU's closely together, it is desirable to remove as many of the side mounted connections as possible. Thus, according to the best mode embodiment of the invention, the displays are custom manufactured specifically to minimize the side mounted connections.

Although the DU 10 is shown as a flat rectangular surface, it can be curved or any other desirable shape. In particular, the BDU's 1A–1T act as tiling elements so that spherical surfaces, or other polyhedral surfaces may be developed. For each of these, the BDU elements 1A–1T must be of appropriate size (in the same way that ceramic tiles can be of differing sizes when tiling a surface to create a mosaic).

Figure 3:
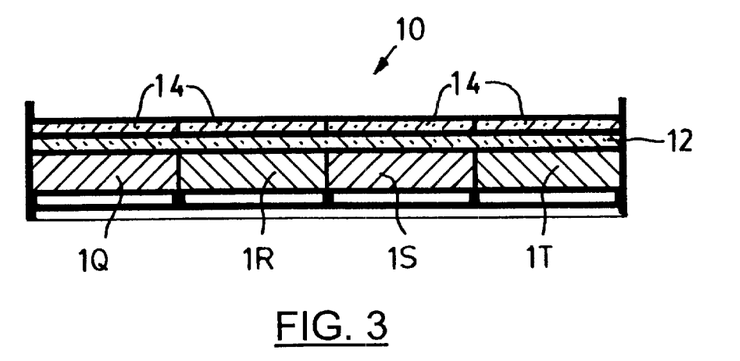
FIG. 3 shows the superposition of a touch-sensitive input panel on the basic display unit.

Referring to FIG. 3; which shows the superposition of a touch-sensitive input device on the display unit 10, a protective surface of clear plastic or glass 12 covers the upper surface of the DU 10, and mounted on top of this surface is a tessellation of transparent touch-sensitive panels 14A–14D. These panels tile the entire upper surface of the DU 10 and may extend beyond the limits of respective BDU's. Each touch-sensitive panel 14A–14D is connected to a corresponding BDU processors 3A–3D, respectively (FIG. 1). The touch-sensitive panels 14A–14D require external power and provide user input through cables 15A–15D via a standard serial or parallel port of the associated BDU processors, in a well known manner.

For reasonably small DU's it is contemplated that only a single touch-sensitive panel 14 will be provided since such panels can be commercially manufactured in reasonably large sizes (2'×2', for example).

Currently, touch-sensitive panels provide for a 1024× 1024 pixel resolution of over a 14" diagonal display (100 square inches roughly), using approximately 10,000 sensors per square inch. The imprint of a normal human finger is on the order of a quarter of a square inch. This requires that each BDU 1A–1T in the display system of the present invention be characterized by a resolution of about 400 pixels total. For example, a DU 10 of 20 BDU's (4×5 units) is therefore characterized by an input resolution of 8000 pixels.

Figure 4:
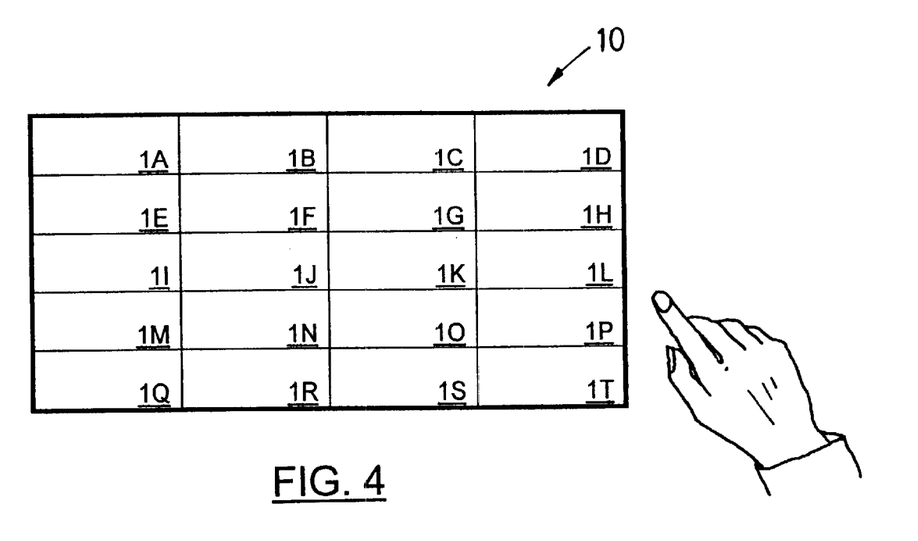
FIG. 4 is a plan view of the touch-sensitive display with human finger as user interface.
Figure 5:
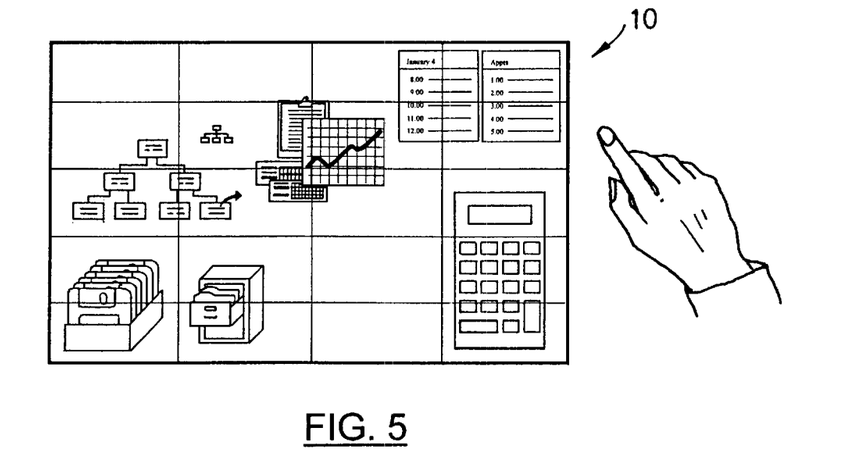
FIG. 5 is a plan view of the touch-sensitive display in use for implementing an executive desktop.
Figure 6:
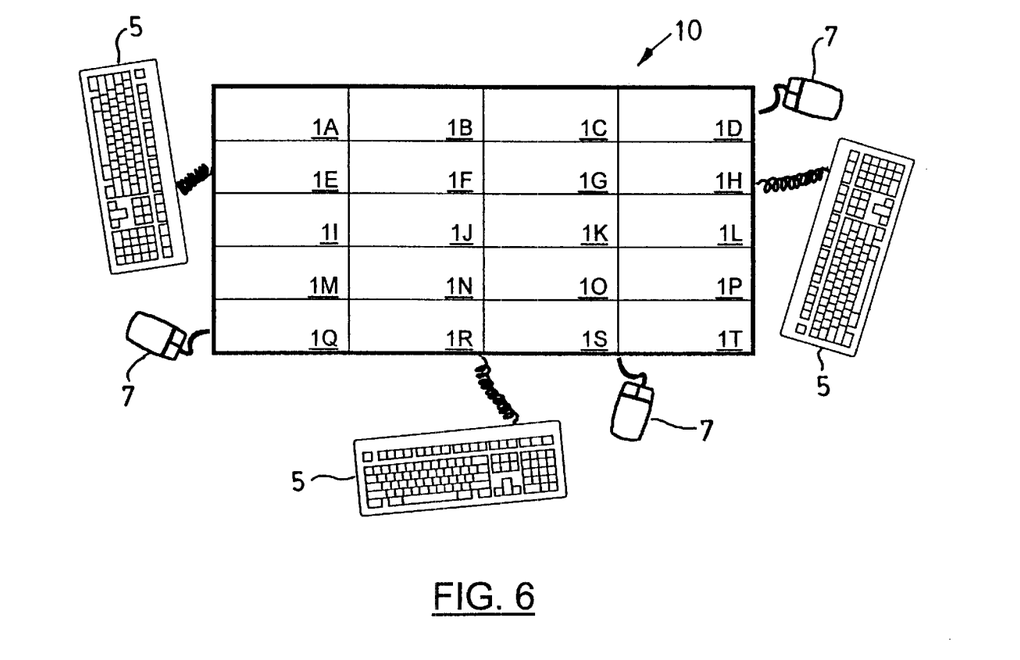
FIG. 6 shows the display in use with multiple user interfaces.

User input to the DU 10 can be accomplished in a number of ways, (see FIGS. 4, 5 and 6). Users may interact via keyboards 5, mice 7, or other standard input devices such as trackballs, tablets, etc., attached to particular BDU's 1A–1T. User input is also provided through the tessellation of touch-sensitive panels 14A–14D mounted on top of the DU 10. The tessellation of touch-sensitive panels 14 acts logically as one large touch-sensitive device. When a user touches a particular panel 14, a signal over cable 15 is sent to the BDU processor 3 connected to that touch-sensitive panel. The physical location of this interaction on a specific touch-sensitive panel 14 is converted into a logical location with respect to the entire display 10, and the interaction is processed by whatever software application is currently undergoing execution. Thus, the entire surface of the DU 10 is treated as a single logical display with a single logical overlapping touch-sensitive input device.

Many possible touch input configurations are contemplated. For example, a calculator keyboard may be displayed on the DU 10 (see FIG. 5), and the user could use this "virtual" keyboard to enter arithmetic operations in the same way as a real calculator keyboard.

Existing networked windowing systems such as X™ provide for multiple overlapping display regions (windows) on multiple displays, but are unable to display a single window over multiple displays. Thus, according to the present invention,.the capability is provided for displaying multiple, overlapping windows, wherein the entire display unit (DU 10) is treated as one logically continuous screen. The display capability is distributed over the respective BDU processors 3; that is, the processor in each BDU 1A–1T controls the contents of its own screen, but does so either in response to user interaction directly therewith (ie. via the associated touch-sensitive panel 14, keyboard 5 or mouse 7), or in response to control signals received from another BDU 1 (ie. the controlling BDU) connected thereto via the standard network interface discussed above.

Figure 7:
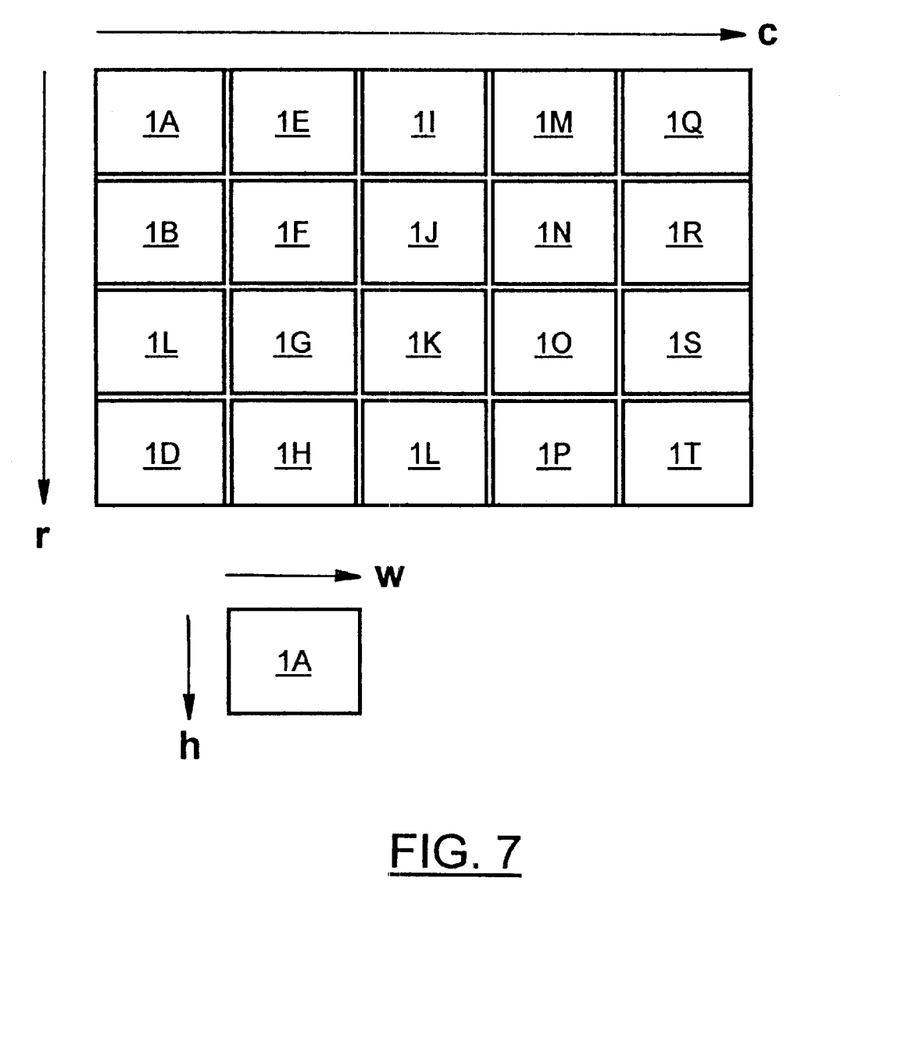
FIG. 7 is a schematic representation of a DU coordinate system according to an aspect of the present invention.

In order that existing software can be easily integrated with the DU 10, the software must "appear" to be running on the DU 10 as a single logical screen. FIG. 7 shows a rectangular tessellation of BDU's 1A–1T forming DU 10, although different tiling patterns of the display surface are possible, as discussed above. Each BDU 1A–1T is characterized by a pixel width w and height h. The numbering of logical pixels and respective BDU's from the upper left hand corner of DU 10 is such that a given logical pixel location (r,c) corresponds to the physical pixel location (mod(r,h), mod (c,w)) on a given BDU positioned at (div(r,h), div(c, w)), within the reference frame of FIG. 7.

It is contemplated that individual BDU's 1A–1T may be mounted in the tessellation in an inverted position. For such an inverted BDU, the logical pixel location (r,c) corresponds to the physical pixel location (h−1−div(r,h), w−1−div(c,w)).

As discussed above, the DU software operates on a specific designated processor, referred to herein as the controlling processor, which can be either one of the BDU processors 3 or an external processor connected to the BDU processors 3 via the network. In response to executing graphical display commands the controlling processor sends messages to the network-connected BDU's of DU 10.

Figure 8:
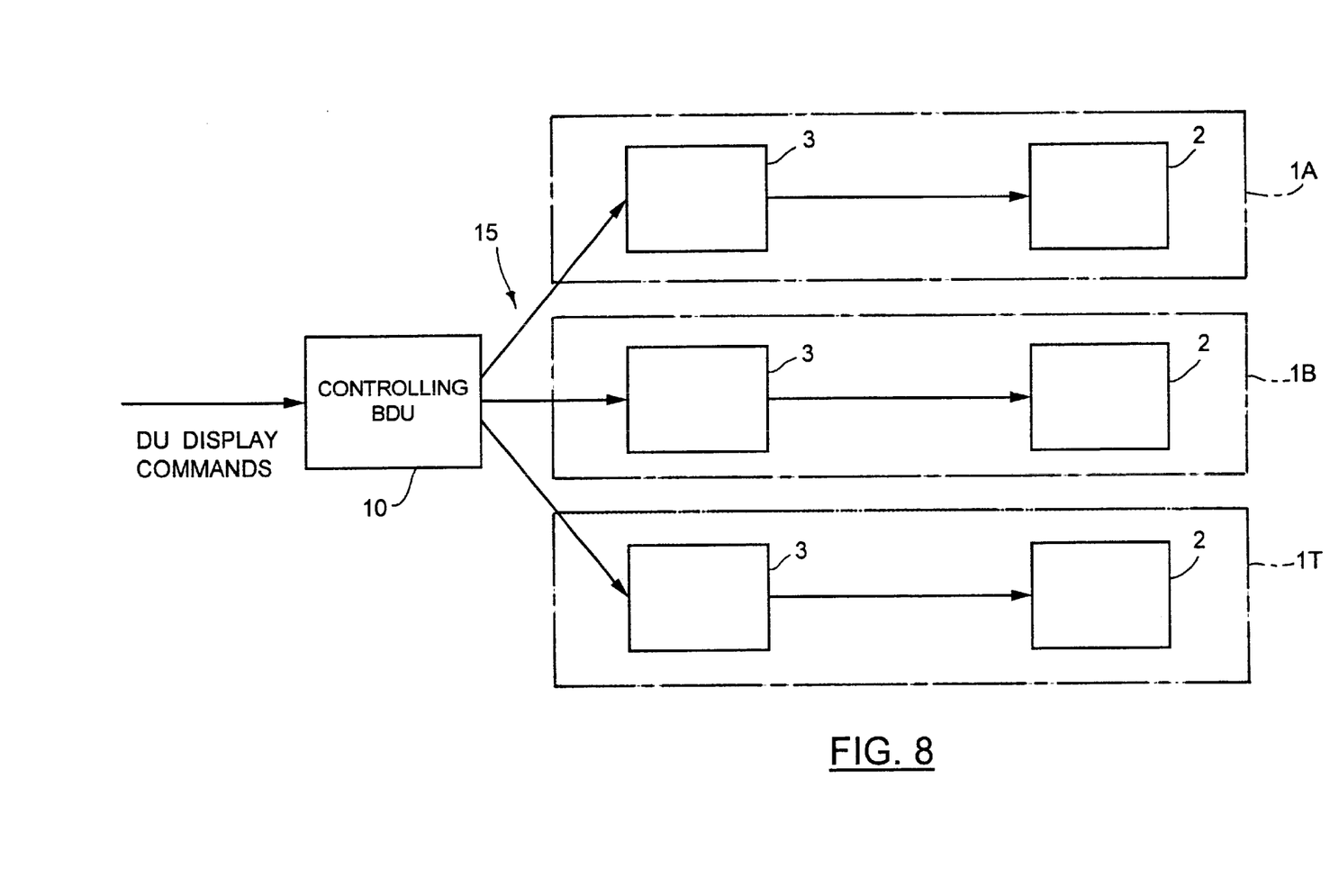
FIG. 8 is a control flow chart showing the flow of messages to a DU driver and messages from the DU driver to a plurality of BDU's.

FIG. 8 is a flowchart showing the flow of messages sent to the controlling processor (e.g. BDU 1D), from an associated input device (e.g. a mouse 7 connected to BDU 1D or an associated touch-sensitive panel 14), and the resulting messages sent to various ones of the BDU's 1A, 1B, . . . , 1T via the network 15.

As discussed above, each BDU 1A–1T has an associated graphics processor which maps a set of graphical instructions for controlling the associated display 2. Simple graphics processors permit setpixel operations for changing the state of an individual pixel, while more complex graphics processors permit operations such as drawline for drawing a line in pixel space, as well as other complex operations. According to the present invention, the DU 10 implements exactly the set of low level operations that are supported by the individual graphics processors associated with each BDU 1A–1T.

For example, in order to implement the DU operation putline (r1,c1,r2,c2) to draw a line in DU coordinates, the software application running on the controlling processor (eg. BDU 1D) sends putline commands via the network 15 to each of the other BDU's that make up the DU 10. Thus, the DU driver (eg. the BDU processor 1D in control of the network 15) sends to the (i,j)th BDU the graphical instruction putline (r1−h*i, c1−w*j, r2−h*i, c2−w*j). Each BDU graphics processor clips the graphical instruction to its own physical coordinate system.

For an arbitrary graphical operation, a transformed version of the operation (i.e. modified graphical command signal) is sent to each BDU for execution. For specific operations, such as putpixel (r,c), wherein the DU driver software executes putpixel (mod(r,h),mod(c,w)) on the (div (r,h),div(c,w)) BDU, it is possible to optimize the total number of command messages sent to each graphics processor.

The tessellation of touch-sensitive panels 14 which covers the display surface of DU 10 operates in a similar. fashion as the respective BDU's of a DU 10. Each one of the touch-sensitive panels 14 is connected to a particular BDU processor 3 associated with a particular BDU. In response to a user touching a particular touch-sensitive panel 14, the associated BDU processor 3 converts the sensed touch input at a predetermined physical pixel location into logical DU device coordinates and transmits this information in the form of input command signals to the controlling processor. The controlling processor then converts the input command signals identifying the aforementioned physical pixel locations to modified input command signals associated with logical pixel locations in the DU 10. The application software running on the controlling processor then responds to the modified input command signals such that the user's touch input is treated as an input operation for the entire logical display DU 10.

By way of example, the operation of the DU 10 in response to a typical user input is described below for a DU 10 comprising four BDU's 1A–1D and a single touch-sensitive panel 14 covering all four BDU's.

An application program being executed by the controlling processor requests that a particular rectangular region of the DU 10 should be changed to show a rectangular bar with the words "Press Here" displayed on it. This request takes the form of one or more graphical command signals for operating on logical pixel locations in the tessellation forming DU 10.

The DU controlling processor (eg. any one of the BDU processors associated with BDU's 1A–1D, or an external processor connected thereto by the network 15), receives the request signals and in response manages the request as a sequence of primitive graphics operations by converting the graphical command signals to modified graphical command signals for operating on the physical pixel locations associated with the BDU's 1A–1T, and then transmitting the modified graphical command signals to the BDU's via the network 15. Each graphics processor of the BDU's which has received the translated request then displays that portion of the requested graphics display that is visible on the associated screen 2. After each processor executes the request, the rectangular bar with the words "Press Here" on it, is displayed across the entire DU 10.

If the user then presses the touch-sensitive panel 14 at a location outside of the rectangular bar region, this press is sensed by the touch sensitive screen 14 and an appropriate input command signal is transmitted to the associated input processor (i.e. the particular BDU 1A–1D to which the panel 14 is connected). The input processor computes the logical DU screen coordinate associated with this press and transmits this information to the DU controlling processor as a modified input command signal. The controlling processor then passes this information back to the application program. The application program may then determine that the press was outside of the rectangular region and respond by beeping or other suitable response.

If the user then presses the touch sensitive screen 14 inside the rectangular bar region, the press is again sensed by the touch sensitive screen 14, and an appropriate input command signal is transmitted from the BDU which controls the panel 14 to the controlling processor. The input command signal is converted to a modified input command signal by the controlling processor for use by the application program. The application program can then respond by requesting that the bar region be cleared to black, or other suitable response.

The controlling processor once again transmits requests to each of the graphics processors of each of the other BDU's after appropriate transformation from logical coordinates to physical coordinates, and the graphics processors then cause the DU screen to be cleared.

Much more complex operations are, of course, possible. For example, a keyboard could be displayed on the DU, and a user program controlling this keyboard could emulate a real keyboard by monitoring presses within the screen regions corresponding to each key location.

Appropriate construction methods are employed to eliminate the problem of small boundaries between the BDU screen "tiles" and the resulting fragmentation of the display, as discussed briefly above. More particularly, according to one aspect of the invention each display is milled on two of its edges to reduce the gap between adjacent BDU screens. Alternatively, the display boards can be milled and then warped by cutting the corners of each board and then melting the board so that the mounting regions are bent away from the display regions. The four screens are then mounted in a frame 9, as discussed above and the one or more touch-sensitive panels 14 are then mounted on the above-mentioned protective surface of clear plastic (eg;. Plexiglas™) or glass 12, which serves to protect the BDU'S 1A–1T.

Other modifications of the invention are contemplated. For example, the use of a touch-pen can further increase the system input resolution. Also, as discussed above, the DU 10 can be controlled by an external processor via the network 15 connecting the BDU's 1A–1T, or for simple software applications the network of BDU's can be self-controlling. All such modifications and embodiments are believed to, be within the sphere and scope of the present invention as defined by the claims appended hereto.

We claim:

1. A touch-sensitive display, comprising:
   a) a plurality of basic display units each comprising processor means connected to at least one display screen, said at least one display screen of respective ones of said basic display units being arranged so as to form a tessellation;
   b) a network for facilitating communication between said respective ones of said basic display units;
   c) at least one touch-sensitive panel overlying said tessellation and means associated therewith for receiving a user touch input over physical pixel locations associated with said basic display units and in response generating input command signals for identifying said physical pixel locations; and
   d) further processor means functioning as a controlling processor, including:
      i) means for receiving said input command signals identifying said physical pixel locations and in response converting said input command signals to modified input command signals associated with logical pixel locations in said tessellation;
      ii) means for receiving said modified input command signals and in response generating graphical command signals for operating on said logical pixel locations in said tessellation;
      iii) means for receiving said graphical command signals for operating on said logical pixel locations in said tessellation and in response converting said graphical command signals to modified graphical command signals for operating on said physical pixel locations associated with said basic display units; and
      iv) means for transmitting said modified graphical command signals to said basic display units via said network, in response to which said plurality of basic display units generate a graphical image across said tessellation.

2. The touch-sensitive display of claim 1, wherein said display screen further comprises a flat panel display screen.

3. The touch-sensitive display of claim 2, wherein said flat panel display screen is a liquid crystal display.

4. The touch-sensitive display of claim 2, wherein said flat panel display screen is a laser plasma display.

5. The touch-sensitive display of claim 2, wherein said flat panel display is approximately ⅛" thick and is mounted in a hard plastic shell.

6. The touch-sensitive screen of claim 2, wherein said flat panel display further includes a light source mounted to the side thereof.

7. The touch-sensitive display of claim 1, wherein each of said plurality of basic display units further comprises a standard portable computer incorporating a CPU for executing a graphics processor application.

8. The touch-sensitive display of claim 1, wherein a predetermined one or more of said basic display units includes one or both of a keyboard and a mouse.

9. The touch-sensitive display of claim 1, wherein said network is realized using TCP/IP as a network interface and an Ethernet™ physical medium between respective ones of said basic display units.

10. The touch-sensitive display of claim 1, wherein said network is realized using Localtalk™ as a network interface and an Ethernet™ physical medium between respective ones of said basic display units.

11. The touch-sensitive display of claim 1, wherein said basic display units are abutted together in close proximity in order to minimize spacing between each display screen of said respective ones of said basic display units.

12. The touch-sensitive display of claim 1, further comprising a transparent protective layer intermediate said at least one touch-sensitive panel and said at least one display screen of respective ones of said basic display units.

13. The touch-sensitive display of claim 12, wherein said transparent protective layer comprises one of either clear plastic or glass.

14. A touch-sensitive display, comprising:
   a plurality of basic display units each comprising a separately controllable processor connected to at least one display screen and a separate input for receiving input command signals independently from the input command signals received from the processors of other basic display units, said at least one display screen of respective ones of said basic display units being arranged so as to form a tessellation;
   a network for facilitating communication between said basic display units; and
   at least one touch-sensitive panel overlying said tessellation and means associated therewith for receiving a user touch input over physical pixel locations associated with said basic display units and in response generating input command signals for identifying said physical pixel locations, wherein a predetermined one of said processors functions as a controlling processor, and further includes:
      means for receiving said input command signals identifying said physical pixel locations and in response converting said input command signals to modified input command signals associated with logical pixel locations in said tessellation;
      means for receiving said modified input command signals and in response generating graphical command signals for operating on said logical pixel locations in said tessellation;
      means for receiving said graphical command signals for operating on said logical pixel locations in said tessellation and in response converting said graphical command signals to modified graphical command signals for operating on said physical pixel locations associated with said basic display units; and
      means for transmitting said modified graphical command signals to said basic display units via said network, in response to which said basic display units generate a graphical image across said tessellation.

15. A touch-sensitive display according to claim 14, wherein said display screen further comprises a flat panel display screen.

16. A touch-sensitive display according to claim 15, wherein said flat panel display screen is a liquid crystal display.

17. A touch-sensitive display according to claim 15, wherein said flat panel display screen is a laser plasma display.

18. A touch-sensitive display according to claim 15, wherein said flat panel display is approximately ⅛" thick and is mounted in a hard plastic shell.

19. A touch-sensitive display according to claim 15, wherein said flat panel display further includes a light source mounted to the side thereof.

20. A touch-sensitive display according to claim 14, wherein each basic display unit further comprises a standard portable computer incorporating a CPU for executing a graphics processor application.

21. A touch-sensitive display according to claim 14, wherein a predetermined one or more of said basic display units includes one or both of a keyboard and a mouse.

22. A touch-sensitive display according to claim 14, wherein said network is realized using TCP/IP as a network interface and an Ethernet™ physical medium between respective ones of said basic display units.

23. A touch-sensitive display according to claim 14, wherein said network is realized using Localtalk™ as a network interface and an Ethernet™ physical medium between respective ones of said basic display units.

24. A touch-sensitive display according to claim 14, wherein said basic display units are abutted together in close proximity in order to reduce spacing between each display screen of said respective ones of said basic display units.

25. A touch-sensitive display according to claim 14, further comprising a transparent protective layer intermediate said at least one touch-sensitive panel and said at least one display screen of respective ones of said basic display units.

26. A touch-sensitive display according to claim 25, wherein said transparent protective layer comprises one of either clear plastic or glass.

27. A method for displaying images on a display device having a plurality of basic display units each coupled together by a network, each basic display unit including a processor connected to at least one touch-sensitive display panel and an input for receiving input command signals, said method comprising the steps of:

arranging the basic display units together into a tessellation for operating as a single display device;

receiving a user touch input on the display panel and in response identifying a physical pixel location on the associated display panel at which said user touch input was made;

sending command signals to the processor connected to the display panel receiving the user touch input;

converting the physical pixel location of the user touch input in accordance with the command signals into a logical pixel location associated with the single display device;

displaying information on each touch-sensitive display panel with the connected processor according to the logical pixel locations; and operating each processor both independently of the other processors and in conjunction with the other processors thereby allowing all display panels to operate both separately and together as a single logical display unit.

28. A distributed user interface comprising:

a plurality of basic display units, each of said basic display units including a processing unit, at least one display screen and at least one user input device, said basic display units being arranged so that the at least one display screen of said basic display units form a tessellation, each said processing unit executing an applications program and generating graphical images that are presented on said at least one display, each said processing unit receiving user input from said at least one input device and commands from other basic display units, each said processing unit being responsive to said commands and updating the graphical images presented on said at least one display screen, said processing unit also being responsive to said user input and updating the graphical images presented on said at least one display screen and/or generating commands for at least one other basic display unit; and a network interconnecting said basic display units to enable commands generated by said basic display units to be conveyed to other basic display units so that user input received by one basic display unit can be used to update the graphical images presented on the at least one display screen of at least one other basic display unit.

29. A distributed user interface according to claim 28 wherein said at least one user input device includes one or more of a keyboard, a mouse, a trackball, and a tablet.

30. A distributed user interface according to claim 28 wherein said tessellation is planar.

31. A distributed user interface according to claim 28 wherein said tessellation is curved.

32. A distributed user interface according to claim 31 wherein said tessellation is spherical.

33. A distributed user interface according to claim 29 further including at least one touch-sensitive panel overlying said tessellation, said at least one touch-sensitive panel being responsive to user contact and providing user input to the basic display unit associated with the location at which user contact on said touch-sensitive panel is made.

34. A distributed user interface according to claim 33 wherein each basic display unit includes one display screen and wherein a separate touch-sensitive panel is associated with each basic display unit and overlies the display screen thereof, said touch-sensitive panel providing said user input to the associated basic display unit in response to user contact thereon.

35. A distributed user interface according to claim 28 wherein said at least one user input device includes at least one touch-sensitive panel, said at least one touch-sensitive panel overlying said tessellation, said at least one touch-sensitive panel being responsive to user contact and providing user input to the basic display unit associated with the location at which user contact on said at least one touch-sensitive panel is made.

36. A distributed user interface according to claim 35 including a touch-sensitive panel associated with each basic display unit.

37. A distributed user interface according to claim 35 wherein said tessellation is planar.

38. A distributed user interface according to claim 35 wherein said tessellation is curved.

* * * * *